(12) United States Patent
Bretmersky et al.

(10) Patent No.: US 7,863,834 B2
(45) Date of Patent: Jan. 4, 2011

(54) ULTRAVIOLET LAMP SYSTEM AND METHOD FOR CONTROLLING EMITTED UV LIGHT

(75) Inventors: Carl A. Bretmersky, North Olmsted, OH (US); James W. Schmitkons, Lorain, OH (US)

(73) Assignee: Nordson Corporation, Westlake, OH (US)

( * ) Notice: Subject to any disclaimer, the term of this patent is extended or adjusted under 35 U.S.C. 154(b) by 431 days.

(21) Appl. No.: 11/771,105

(22) Filed: Jun. 29, 2007

(65) Prior Publication Data

US 2009/0001901 A1 Jan. 1, 2009

(51) Int. Cl.
*H05B 37/02* (2006.01)
(52) U.S. Cl. ............... 315/308; 315/39.51; 315/248
(58) Field of Classification Search ............... 315/39, 315/39.51, 39.53, 39.63, 248, 291, 307–308
See application file for complete search history.

(56) References Cited

U.S. PATENT DOCUMENTS

| | | | | |
|---|---|---|---|---|
| 4,481,447 A | * | 11/1984 | Stupp et al. | ............... 315/101 |
| 5,438,242 A | * | 8/1995 | Simpson | ............... 315/219 |
| 5,642,268 A | * | 6/1997 | Pratt et al. | ............... 363/17 |
| 6,265,830 B1 | | 7/2001 | Bretmersky et al. | |
| 6,559,460 B1 | | 5/2003 | Keogh et al. | |
| 6,657,206 B2 | | 12/2003 | Keogh et al. | |
| 6,693,382 B2 | * | 2/2004 | Little et al. | ............... 315/157 |
| 6,696,801 B2 | | 2/2004 | Schmitkons et al. | |
| 6,850,010 B1 | * | 2/2005 | Barry et al. | ............... 315/39.51 |
| 6,952,082 B2 | | 10/2005 | Schmitkons et al. | |
| 7,109,669 B2 | * | 9/2006 | Bretmersky et al. | ............... 315/308 |

* cited by examiner

*Primary Examiner*—Douglas W Owens
*Assistant Examiner*—Tung X Le
(74) *Attorney, Agent, or Firm*—Wood, Herron & Evans, L.L.P.

(57) ABSTRACT

An ultraviolet lamp assembly and corresponding methods is operable to generate ultraviolet light for irradiating a substrate. The lamp assembly includes a magnetron, an electrodeless lamp for emitting ultraviolet light when excited by microwave radiation generated from the magnetron, and a power control circuit arrangement configured to control an output power of the microwave radiation generated by the magnetron corresponding to the intensity of ultraviolet light produced by the lamp. A first control loop of the power control circuit is configured to regulate an input current to the magnetron based upon an input current setting associated with a desired intensity of UV light output of the lamp and a second control loop coupled to the first control loop configured to adjust the input current setting used by the first control loop to regulate the input current to the magnetron based upon an input power to the magnetron, which is proportional to the intensity of UV light output from the lamp.

14 Claims, 4 Drawing Sheets

ULTRAVIOLET LAMP SYSTEM AND METHOD FOR CONTROLLING EMITTED UV LIGHT

FIELD OF THE INVENTION

The present invention relates generally to ultraviolet lamp systems and, more particularly, to power regulation of microwave-excited ultraviolet lamp systems.

BACKGROUND OF THE INVENTION

Ultraviolet (UV) lamp systems are commonly used for heating and curing materials such as adhesives, sealants, inks, and coatings. Certain ultraviolet lamp systems have electrodeless light sources and operate by exciting an electrodeless plasma lamp with microwave energy. In an electrodeless ultraviolet lamp system that relies upon excitation with microwave energy, the electrodeless plasma lamp is mounted within a metallic microwave cavity or chamber. One or more microwave generators, such as magnetrons, are coupled via waveguides with the interior of the microwave chamber. The magnetrons supply microwave energy to initiate and sustain a plasma from a gas mixture enclosed in the plasma lamp. The plasma emits a characteristic spectrum of electromagnetic radiation strongly weighted with spectral lines or photons having ultraviolet and infrared wavelengths.

To irradiate a substrate, the ultraviolet light is directed from the microwave chamber through a chamber outlet to an external location. The chamber outlet is capable of blocking emission of microwave energy while allowing ultraviolet light to be transmitted outside the microwave chamber. A fine-meshed metal screen covers the chamber outlet of many conventional ultraviolet lamp systems. The openings in the metal screen transmit the ultraviolet light for irradiating a substrate positioned outside the RF chamber; yet substantially block the emission of microwave energy.

Some applications of the UV lamp systems require very precise intensities of ultraviolet light. These applications are sensitive to changes in the UV light intensity, requiring the light intensity to be substantially constant. Providing a substantially constant UV light intensity presents some challenges. First, manufacturing tolerances associated with the magnetrons play a significant role in the output of each magnetron, which is directly proportional to the intensity of the UV light. A manufacturer of a magnetron may have output target values for a magnetron of, for example, approximately 3,000 W. Due to manufacturing tolerances, however, the actual output value of the magnetron could be lower than or higher than the 3000 W target output. Some manufacturers supply tolerance ranges with their magnetrons, without providing specific output values of each magnetron. This introduces some uncertainty as to the actual output of the magnetron used in the UV lamp system. Variances in tolerances between the magnetrons leads to variances in the outputs of each of the magnetrons, which causes UV light intensities to be different between different lamp systems.

A second challenge to providing substantially constant light intensity from the UV lamp systems is the tendency for the output power to drop as the lamp system and magnetrons heat up. As the UV lamp system heats up, warming the ceramic magnets in the magnetrons, the strength of the magnets declines. Input voltage to the magnetron is a function of current and the magnetic field and as a result of a declining magnetic field, the input voltage to the magnetron also drops. Given a substantially constant current to the magnetron, the drop in input voltage results in a drop in input power. As input power to the magnetron is reduced, so to is the output power, reducing the intensity of the ultraviolet light. After about 5 to 10 minutes of operation, the thermal changes to the system stabilize which then settles the output power of the magnetrons and ultimately the ultraviolet light intensity.

SUMMARY OF THE INVENTION

Embodiments of the present invention address these and other problems associated with the prior art by providing an ultraviolet lamp assembly and corresponding methods operable to generate ultraviolet light for irradiating a substrate. The ultraviolet lamp assembly includes a magnetron, an electrodeless lamp for emitting ultraviolet light when excited by microwave radiation generated from the magnetron and a power control circuit arrangement for controlling the output power of microwave radiation by the magnetron and corresponding intensity of ultraviolet light produced by the lamp. The power control circuit arrangement includes a first control loop configured to regulate an input current to the magnetron based upon an input current setting associated with a desired output power for the magnetron and a second control loop coupled to the first control loop and configured to adjust the input current setting used by the first control loop to regulate the input current to the magnetron based upon an input power to the magnetron, which is proportional to the light intensity produced by the lamp.

In one embodiment, the second control loop is configured with a voltage divider that measures the input voltage to the magnetron. A current sensor is configured to sense the input current in the first control loop, which is sent to a control that also receives input voltage from the voltage divider. The control calculates the input power using the voltage from the voltage divider and the current from the first control loop to make adjustments to the input current, which provides a substantially constant input power, thereby providing a substantially constant UV light intensity. Adjustments to the input current in the first control loop are limited by a current limiter in the second control loop.

In some embodiments, the second control loop is configured to adjust the input current setting of the first control loop periodically. The periodic adjustments to the input power of the magnetron provide for a more constant UV light output without the intervention of an operator or the need for continual calibration.

BRIEF DESCRIPTION OF THE DRAWINGS

The accompanying drawings illustrate embodiments of the invention and, together with a general description of the invention given above, and the detailed description given below, serve to explain the principles of the invention.

DETAILED DESCRIPTION

In general, there are variations in the power output of magnetrons used in ultraviolet lamp systems. These variations may be caused by manufacturing tolerances and operating temperatures. The variations in the power output of the magnetrons directly correlate to variations in the ultraviolet light intensity of the lamp system. The output power variation generally causes the light intensity of the lamp to drop as the magnetron(s) warm up, thus creating difficulties for some applications that are sensitive to changes in the intensity of UV light. These critical processes tend to require consistent light intensity between all the lamps in a particular system.

Embodiments of the present invention provide an ultraviolet lamp system with a power control circuit arrangement for the magnetron that assists in providing a substantially constant power output, which is directly proportional to the UV light intensity, typically without operator intervention. A conventional fast current feedback control loop is used to regulate the input current to each magnetron, and a periodic secondary control loop is used to automatically adjust a current set point of the first control loop, thus regulating the input power. For purposes of this application, periodic is synonymous with intermittent as the secondary control loop may be performed at regular intervals, or the intervals between the corrections may be variable, e.g. more frequent during the initial power up and heating of the lamp system.

Figure 1:
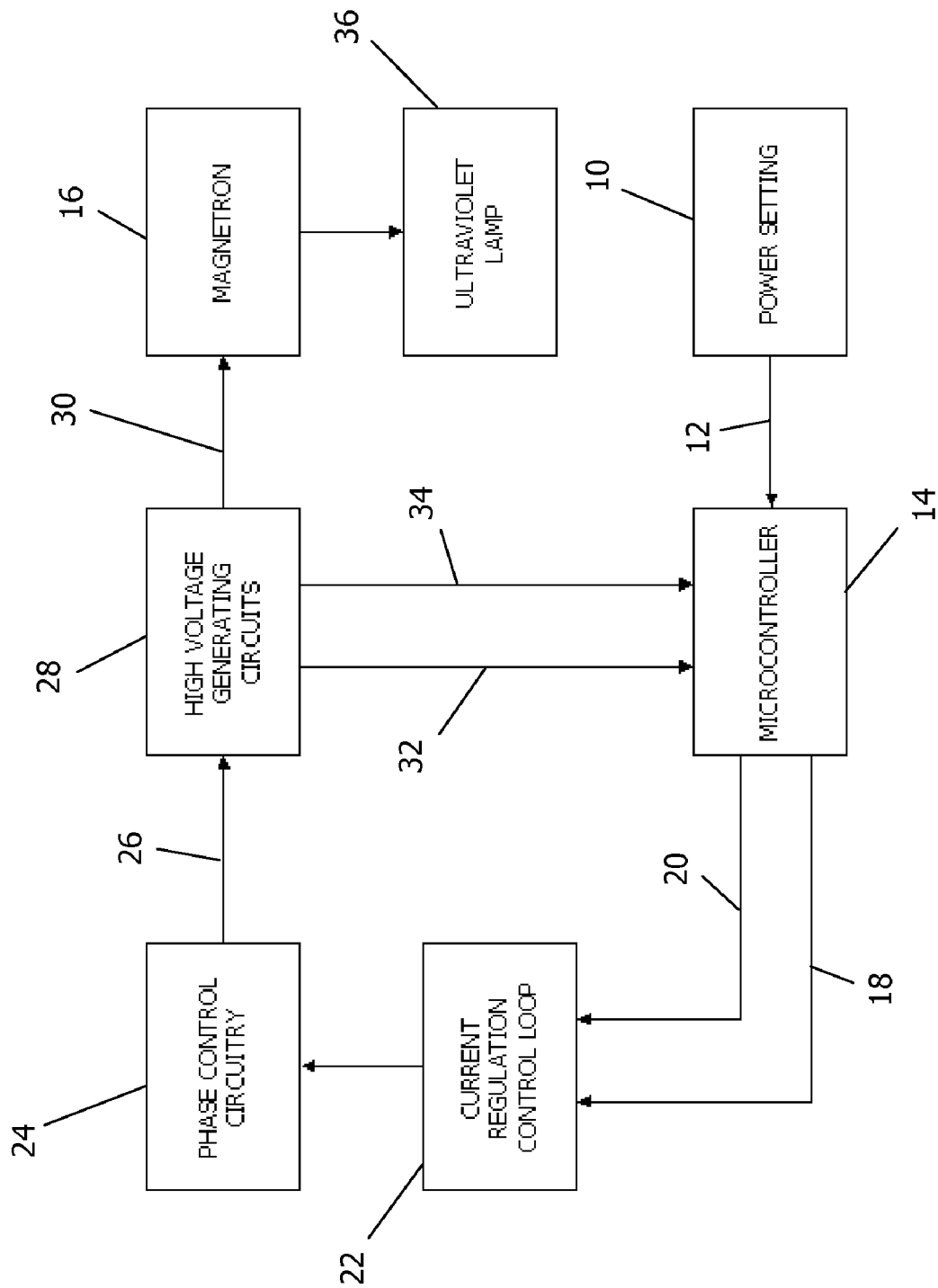
FIG. 1 is a block diagram illustrating an embodiment of an ultraviolet lamp assembly including a power control circuit for a magnetron used to excite an electrodeless lamp to produce UV light consistent with the invention.

Turning now to the drawings, wherein like numbers denote like parts throughout the several views, FIG. 1 shows a block diagram of a lamp system with an exemplary power control loop consistent with the invention. The power control loop circuitry is designed to control the input power to the magnetron, which generally has a good correlation to the magnetron output power and UV light output intensity, rather than controlling only the input current as is commonly done in the art. An operator of a UV lamp system selects a power setting 10, which sends a desired power level represented by the diagrammatic arrow 12 to a microcontroller 14. The microcontroller 14 initially sets a current level for the magnetron 16 in order to achieve the requested output power. The microcontroller then sends the set point current 18 and actual magnetron current 20 to circuitry for the current regulation control loop 22. The current regulation control loop 22 consists of circuitry operable to provide a fast current feedback control loop to regulate and provide a substantially constant current output as known in the art.

The current regulation circuitry 22 utilizes a microcontroller, which may be microcontroller 14 or may be a separate microcontroller specifically for current regulation. The current regulation circuitry 22 then sends the regulated current to phase control circuitry 24, which sends a variable AC signal, represented by the diagrammatic arrow 26, to high voltage generating circuits 28. The high voltage generating circuits send a variable high voltage DC signal, represented by the diagrammatic arrow 30, to the magnetron 16 to produce the desired output, which excites the UV lamp 36, creating ultraviolet light that is emitted from the lamp assembly.

Periodically, the high voltage generating circuits 28 send magnetron voltage signals, represented by diagrammatic arrow 32, and magnetron current signals, represented by diagrammatic arrow 34, to the microcontroller 14. The magnetron voltage signals 32 and current signals 34, are used by the microcontroller 14 to determine actual magnetron input power and determine an adjustment to the set current if the input power deviates from the desired power level 12. The microcontroller then sends the actual magnetron current 20 with the adjusted set point current 18 to the current regulation circuitry 22 to automatically adjust the input power to the magnetron.

Figure 2:
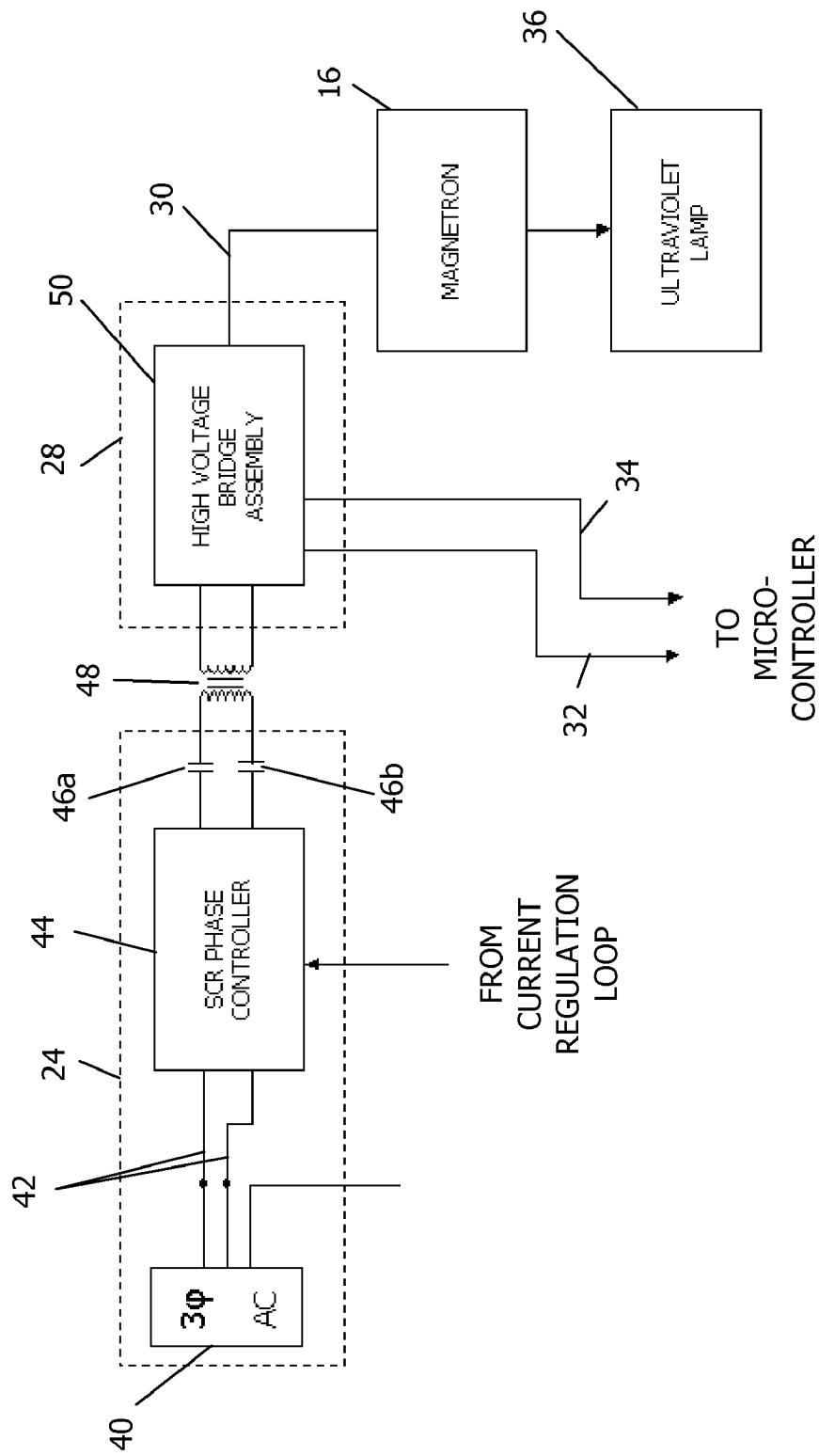
FIG. 2 is a schematic diagram of a portion of the power control circuit of FIG. 1.

Additional detail of the phase control circuitry 24 and the high voltage generating circuits 28 may be seen in FIG. 2. In some embodiments, the phase control circuitry 24 is composed of a 3-phase high voltage power source 40. Voltages for the power source 40 may be, for example, approximately 480 V per phase. One phase 42 of the power source 40 is sent to an SCR phase controller 44. The other phases may power other magnetrons in alternate embodiments of the UV lamp system having additional magnetrons, or other components of the UV lamp system. Output signals from the current regulation control loop 22 (FIG. 1) are used to control pulses in the phase controller 44. Output from the phase controller is then be sent through a contactor 46a, 46b and to an isolation transformer 48. The high voltage AC power is transferred over the transformer 48 to a high voltage bridge assembly 50, which converts the high voltage AC power to a high voltage DC signal 30 that is then sent to the magnetron 16. The bridge assembly also sends magnetron input voltage signals 32 and magnetron input current 34 signals to the microcontroller 14 (FIG. 1) to be used to determine the input power of the magnetron 16 during the control loop for power regulation.

There is generally a good correlation between the input power and output power of a magnetron as would be known to a person of ordinary skill in the art. Because of this correlation, it is possible to achieve a substantially constant output power and thus a substantially constant intensity of UV light output by regulating the input power of the magnetron. Current and power regulation for the magnetron includes a first, inner control loop regulating the current to the magnetron and a second, outer control loop regulating the input power to the magnetron. Most of the variation in output power typically occurs in the first 5 to 10 minutes of operation as the UV lamp system heats up and stabilizes; therefore, it may not be necessary to continually monitor and adjust the input power in the second control loop. Providing the second, outer control loop to regulate the input power may assist in providing a near constant output power during the 5 to 10 minute warm up stage of the system. This may be beneficial to operators of the UV Lamp system that have applications requiring cycling of the UV Lamp system rather than the system being constantly on, as well as those having critical applications that are sensitive to changes in UV light requiring a substantially constant output.

Figure 3:
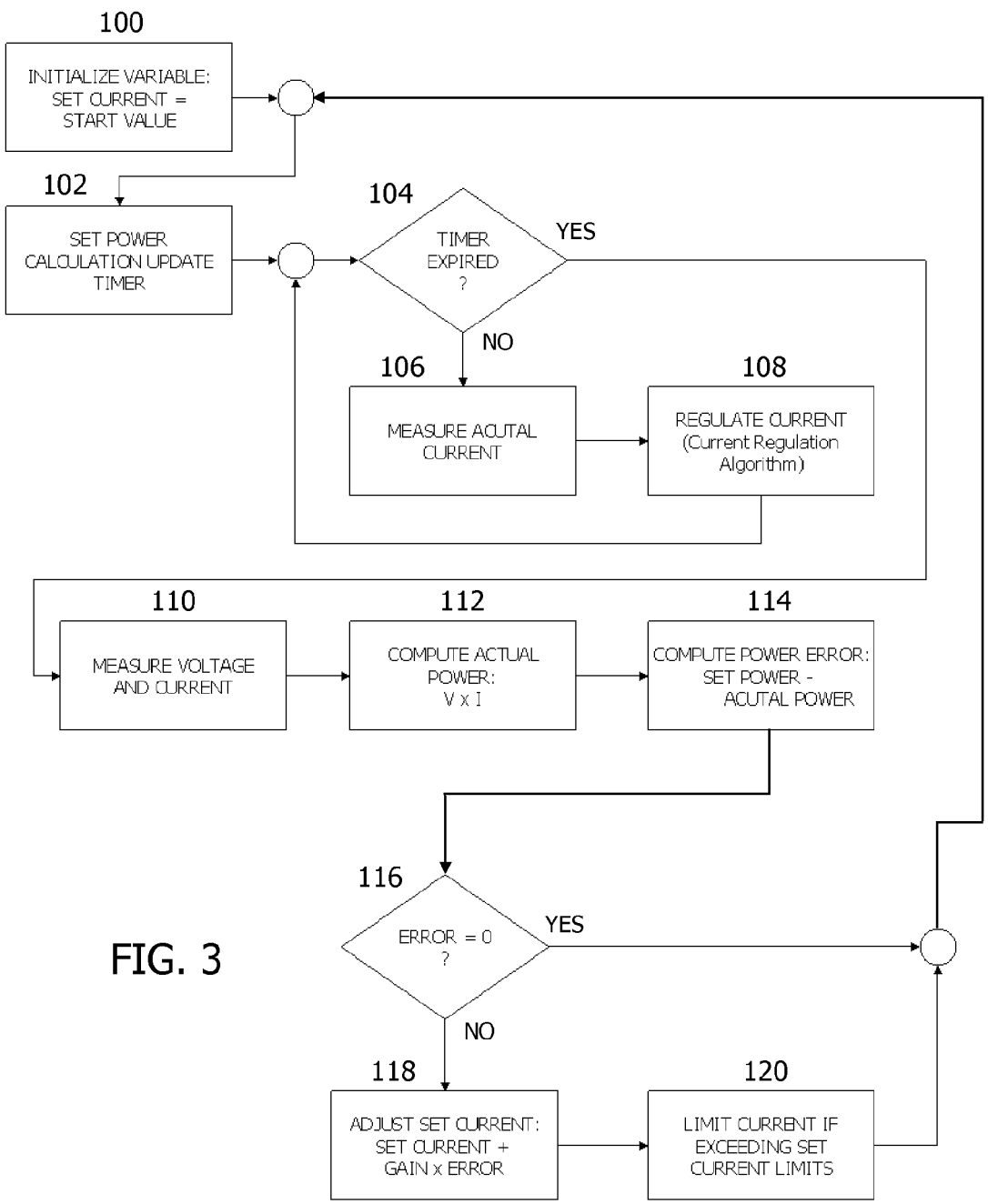
FIG. 3 is a flowchart illustrating the operation of an embodiment of the power control circuit of FIG. 1.
Figure 4:
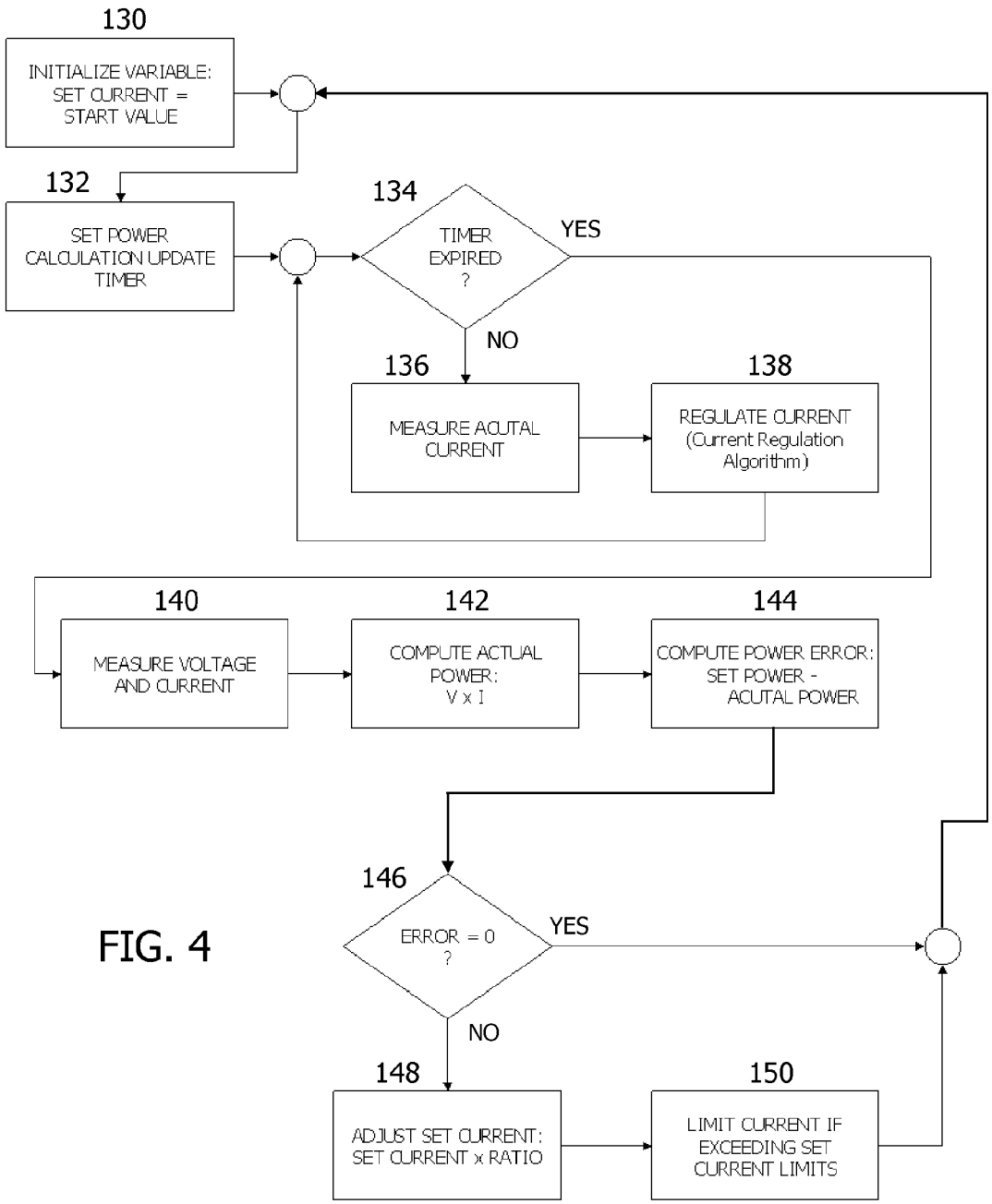
FIG. 4. is a flowchart illustrating the operation of an alternate embodiment of the power control circuit in FIG. 1.

FIGS. 3 and 4 are flowcharts illustrating the operation of two embodiments of the control loops for the power control circuit. The embodiments employ the same current regulation steps, though other embodiments may use different approaches for current regulation. Beginning in block 100, the input current value is set to a start value to achieve a particular output power corresponding to a desired intensity of UV light output. The start value is chosen by an operator of the UV Lamp system based on a proportional relationship between the input current and output power. Input currents are selected to produce initial output powers, for example, of approximately 35% to 100% output power.

A timer for the power regulation second control loop is set in block 102, and if the timer has not expired (no branch of decision block 104), the actual current is measured in block 106 by a current sensor. The current is then regulated, for example, by a current regulation algorithm, in block 108 as is presently known in the art. Any method or hardware configuration may be used that is compatible with the UV Lamp system and is operable to provide a source of substantially constant current to the magnetron. This loop continues, regulating the input current to the magnetron until the timer for the power regulation has expired (yes branch of decision block 104).

The time to complete the first control loop may be on the order of 4-5 ms, in order to properly regulate the current to provide a near constant current source. This control loop may execute many times prior to an execution of the second control loop. The second loop timer is set to initiate the second control loop, for example, approximately every 5 to 10 seconds. In some embodiments, the input power may be regulated more or less frequently. Knowing that the power tends to stabilize after approximately 5 to 10 minutes of operation, the second loop timer may have variable time limits, initiating the second control loop more frequently during the warm up period and less frequently during continued operation.

In the embodiment illustrated in FIG. 3, the second control loop begins by measuring the voltage, at for example a voltage divider in the high voltage bridge assembly discussed above, and the current from the current sensor (measured in block 106) in the first control loop in block 110. In alternate embodiments, current may also be supplied from the bridge assembly. The actual power is computed from the voltage and input current in block 112. A power error is then computed by subtracting the actual power from the set power in block 114. In other embodiments, other methods may be used to determine an error or a deviation between the set power and the actual measured power. If the difference between the set power and the actual power is near zero, indicating no error (yes branch of decision block 116), then adjustments to the input current may be unnecessary and a new value of the second loop timer is set in block 102. If, however, there is an error computed (no branch of decision block 116), then an adjustment is made to the input current in block 118 according to the equation below:

$$\text{Input Current} = \text{Input Current} + (\text{Gain} \times \text{Power Error})$$

where Gain is empirically derived. In some embodiments, the adjusted input current may then be limited if the value exceeds set current limits in block 120. After the current has been adjusted, a new value of the second loop timer is set in block 102 and the first control loop continues to regulate the new adjusted input current until the next occurrence of the time expiring.

Another embodiment of the second control loop, illustrated in FIG. 4, utilizes a different approach to adjusting the input current. Similar to the embodiment in FIG. 3, voltage and current are measured in block 140 and actual power is calculated from the voltage and current in block 142. Also, similar to the embodiment above, a power error is computed in block 144. If the difference between the set power and the actual power is near zero, indicating no error (yes branch of decision block 146), then adjustments to the input current may be unnecessary and a new value of the second loop timer is set in block 132. If however there is a power error (no branch of decision block 146) an adjustment to the input current is made. As discussed above, the input current to the magnetron is approximately linearly proportional to output power of the magnetron. Additionally, an assumption can be made that the efficiency of the electrodeless plasma lamp remains fairly constant over the operating output power range of the lamp system. Based on these two data points, the ratio of theoretical input power to actual input power may be used to modify the input to calculate the new magnetron input current. Therefore, in this embodiment, the current is adjusted by multiplying the current value by a ratio in block 148, where the ratio is:

$$\text{Ratio} = \text{previous Ratio} \times \frac{\text{Set Power}}{\text{Actual Power}}$$

The response of the second control loop may be improved using the ratio by producing an input current for a stabilized power input in fewer cycles than with other methods. After the input current has been adjusted, similar to the previous embodiment, the adjusted input current may then be limited if the value exceeds set current limits in block 150. After the current has been adjusted, a new value of the second loop timer is set in block 132 and the first control loop continues to regulate the new adjusted input current until the next occurrence of the time expiring.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. An ultraviolet lamp assembly for irradiating a substrate, comprising:
    a magnetron;
    an electrodeless lamp configured to emit ultraviolet light when excited by microwave radiation generated from said magnetron; and
    a power control circuit for controlling emission of ultraviolet light by said electrodeless lamp, said power control circuit including:
        a microcontroller;
        a first control loop including said microcontroller and configured to adjust an input current to said magnetron based upon an input current setting associated with a desired output power for said magnetron; and
        a second control loop including said microcontroller and coupled to said first control loop and further configured to adjust the input current setting used by said first control loop to adjust said input current to said magnetron in response to a change in input power to said magnetron measured from a change in voltage by said microcontroller.

2. The ultraviolet lamp assembly of claim 1, wherein said second control loop periodically adjusts the input current setting of said first control loop.

3. The ultraviolet lamp assembly of claim 1, wherein said second control loop comprises:
    a power measurement circuit configured to measure an input voltage and an input current to said magnetron.

4. The ultraviolet lamp assembly of claim 3, wherein said power measurement circuit comprises:
    a voltage divider configured to measure said input voltage to said magnetron;
    a current sensor configured to sense said input current in said first control loop; and
    a control, receiving input voltage from said voltage divider and input current from said current sensor to calculate power, and operable to adjust said input current to provide a substantially constant input power in response to said calculated power.

5. The ultraviolet lamp assembly of claim 4, wherein said voltage divider comprises:
    a potted assembly including a diode block and corresponding resistor network.

6. The ultraviolet lamp assembly of claim 4, wherein said second control loop further comprises:
a current limiter providing a limit to said input current in said first control loop.

7. A method of controlling ultraviolet light emitted from an electrodeless lamp by regulating input power to a magnetron in an ultraviolet lamp assembly, comprising:
adjusting an input current to the magnetron based upon an input current setting associated with a desired output power for the magnetron with a first control loop including a microcontroller;
measuring an input power supplied to the magnetron;
adjusting the input current setting based upon the measured input power to adjust the input current to the magnetron with a second control loop coupled to said first control loop and including said microcontroller; and
applying the output power from the magnetron to the electrodeless lamp for emitting ultraviolet light.

8. The method of claim 7, further comprising:
limiting the adjustment to the input current setting.

9. The method of claim 7, wherein measuring the input power comprises:
measuring an input voltage to the magnetron across a voltage divider; and
measuring the input current in a current sensor.

10. The method of claim 9, further comprising:
computing the input power from said measured input voltage and measured input current; and
computing a change in the input current setting by comparing a set power to the input power.

11. A method of controlling ultraviolet light emitted from an electrodeless lamp by regulating input power to a magnetron in an ultraviolet lamp assembly, comprising:
adjusting an input current to the magnetron based upon an input current setting associated with a desired output power for the magnetron;
measuring an input power supplied to the magnetron, wherein measuring the input power comprises:
measuring an input voltage to the magnetron across a voltage divider; and
measuring the input current in a current sensor;
computing the input power from the measured input voltage and measured input current;
computing a change in the input current setting by comparing a set power to the input power, wherein computing the change comprises:
computing a power error by subtracting the input power from the set power; and
in response to a non-zero power error, adding the power error multiplied by a gain to the input current setting;
adjusting the input current setting based upon the computed change in the input current to adjust the input current to the magnetron; and
applying the output power from the magnetron to the electrodeless lamp for emitting ultraviolet light.

12. A method of controlling ultraviolet light emitted from an electrodeless lamp by regulating input power to a magnetron in an ultraviolet lamp assembly, comprising:
adjusting an input current to the magnetron based upon an input current setting associated with a desired output power for the magnetron;
measuring an input power supplied to the magnetron, wherein measuring the input power comprises:
measuring an input voltage to the magnetron across a voltage divider; and
measuring the input current in a current sensor;
computing the input power from the measured input voltage and measured input current;
computing a change in the input current setting by comparing a set power to the input power, wherein computing the change comprises:
computing a power error by subtracting the input power from the set power; and
in response to a non-zero power error, multiplying the input current by a ratio;
adjusting the input current setting based upon the computed change in the input current to adjust the input current to the magnetron; and
applying the output power from the magnetron to the electrodeless lamp for emitting ultraviolet light.

13. The method of claim 12, wherein the ratio is a previous ratio multiplied by the ratio of the set power to the input power.

14. An ultraviolet lamp assembly for irradiating a substrate, comprising:
a magnetron;
an electrodeless lamp configured to emit ultraviolet light when excited by microwave radiation generated from said magnetron; and
a power control circuit for controlling emission of ultraviolet light by said electrodeless lamp and having a microcontroller, a first control loop, and a second control loop, said power control circuit configured to:
in said first control loop, adjust an input current to said magnetron by said microcontroller based upon an input current setting associated with a desired output power for said magnetron; and
in said second control loop, adjust said input current to said magnetron by said microcontroller in response to a measured input power to said magnetron,
wherein said microcontroller is part of said first control loop and said microcontroller is part of said second control loop, and
wherein said second control loop is coupled to said first control loop.

* * * * *